United States Patent [19]
Kamata et al.

[11] Patent Number: 5,361,108
[45] Date of Patent: Nov. 1, 1994

[54] LENS-FITTED PHOTOGRAPHIC FILM UNIT WITH PLURAL TAKING LENSES

[75] Inventors: Kazuo Kamata; Katsuji Muramatsu, both of Saitama, Japan

[73] Assignee: Fuji Photo Film Co., Ltd., Kanagawa, Japan

[21] Appl. No.: 92,440

[22] Filed: Jul. 14, 1993

[30] Foreign Application Priority Data

Jul. 14, 1992 [JP] Japan ................................. 4-187071
Oct. 15, 1992 [JP] Japan ................................. 4-277459

[51] Int. Cl.⁵ .............................................. G03B 1/00
[52] U.S. Cl. ...................................... 354/120; 354/236
[58] Field of Search .................. 354/109, 120, 195.12, 354/118, 226, 236, 250, 252, 256

[56] References Cited

U.S. PATENT DOCUMENTS

3,069,987 12/1962 Harrington ........................ 354/120
4,589,748 5/1986 Ohmura ........................ 354/195.12
4,884,087 11/1989 Mochida et al. ........................ 354/75
5,164,753 11/1992 Fritzer ........................ 354/120

*Primary Examiner*—David M. Gray
*Attorney, Agent, or Firm*—Young & Thompson

[57] ABSTRACT

A lens-fitted photographic film unit has telephotographic and wide angle lenses to perform telephotography and wide-angle photography simultaneously, and a viewfinder to observe the taking field at least for telephotography. A telephotographic lens is arranged in front of a single shutter blade, behind which a wide-angle lens is arranged. The telephotographic lens is disposed on the side of a film supply chamber while the wide angle lens is disposed on the side of a film take-up chamber. The viewfinder is disposed directly over the telephotographic lens to compensate parallax. The front window of the viewfinder is provided with a translucent film whose middle portion is clear. The entire frame formed by the front window is the visual field frame for standard photography and the frame formed by the clear portion is the visual field frame for telephotography.

28 Claims, 5 Drawing Sheets

LENS-FITTED PHOTOGRAPHIC FILM UNIT WITH PLURAL TAKING LENSES

BACKGROUND OF THE INVENTION

1. Field of the Invention

The present invention relates to a lens-fitted photographic film unit with plural taking lenses, having different focal lengths for taking plural photographs simultaneously, more particularly, to a lens-fitted photographic film unit having an improved viewfinder.

2. Prior Art

There are well known lens-fitted photographic film units (hereinafter simply referred to as film units) having a preloaded photographic film and a simple photograph-taking mechanism, as disclosed in U.S. Pat. No. 4,884,087. When all the available frames of a photographic film have been exposed in such a film unit, it is necessary only to bring the film unit in its entirety to a photofinishing agent, without the need to remove the photographic film cassette from the film unit. Such film units have been used widely because of such ease and convenience.

In addition to ease and convenience, photographers recently have come to desire to take a wide-angle photograph with the main subject against a wide background and a telephotograph with the enlarged main subject in the same scene, for example when sightseeing, viewing children's school sports, or the like. In order to do this, it is possible to use a single-lens reflex camera with a zoom lens or a compact camera with a built-in zoom lens, or built-in telephotographic and wide angle lenses.

However, in this case, photographers need to take photographs of the same scene twice, by zooming or by selecting a telephotographic lens and then a wide angle lens. Therefore, when taking a moving main subject in e.g., school sports, this cannot be done, because it takes a certain time to switch between telephotography and standard photography.

In view of the above problem, there has been suggested a film unit with two taking lenses having different focal lengths, e.g., a telephotographic lens and a wide-angle (standard) lens by which a telephotographic sub-frame and a wide-angle (standard) sub-frame are simultaneously provided in a full size original frame of 135-type photographic film, upon depression of a shutter release button. Since the two taking lenses have different focal lengths, two viewfinders are also provided in the film unit to ascertain the taking fields respectively for telephotography and for wide-angle (standard) photography, or a field of view frame for telephotography is formed within a viewfinder for wide-angle (standard) photography.

However, it is impossible to form the film unit compactly because of the provision of the two viewfinders, even though miniaturization has been a recent trend. Also, when providing a plurality of taking lenses having different focal lengths, a shutter blade needs to be provided for each taking lens, and this requires a complex shutter mechanism, resulting in high manufacturing cost.

OBJECTS OF THE INVENTION

It is accordingly an object of the present invention to provide a compact lens-fitted photographic film unit with a plurality of taking lenses for taking a plurality of photographs simultaneously.

It is another object of the present invention to provide a lens-fitted photographic film unit which can be provided with a simple shutter mechanism for opening/closing the optical paths of plural taking lenses.

SUMMARY OF THE INVENTION

In order to achieve the above and other objects, a lens-fitted photographic film unit of the present invention has a first taking lens, a second taking lens with a shorter focal length than the first taking lens, and a viewfinder for observing the taking field of the first taking lens. When a shutter release button is depressed, a single shutter blade is opened and closed to form two original sub-frames in a full size original frame or panoramic size original frame.

Since the taking field of the first taking lens is smaller than that of the second taking lens, it is possible to make the viewfinder smaller, contributing to miniaturization of the film unit. Also, since the two original sub-frames can be formed at the same time by providing a simple and single shutter blade, product cost can be lowered.

In a preferred embodiment, the first taking lens is disposed on the side of a film supply chamber while the second taking lens is disposed on the side of a film take-up chamber. A viewfinder is disposed directly over the firs taking lens. Therefore, it is possible not only to form the film unit compacter but also to form the viewfinder without interfering with the film wind-up mechanism, the shutter charging mechanism, etc. provided on the side of the film take-up chamber. Furthermore, since the first taking lens is positioned on a vertical line passing through the center of the viewfinder, it is possible to reduce the influence of parallax between the first taking lens and the viewfinder.

BRIEF DESCRIPTION OF THE DRAWINGS

The above and other objects and advantages of the present invention will become apparent from the following description of preferred embodiments when read in conjunction with the accompanying drawings, wherein the same reference numerals designate the same elements throughout the several views, and in which.

DETAILED DESCRIPTION OF THE PREFERRED EMBODIMENTS

Figure 1:
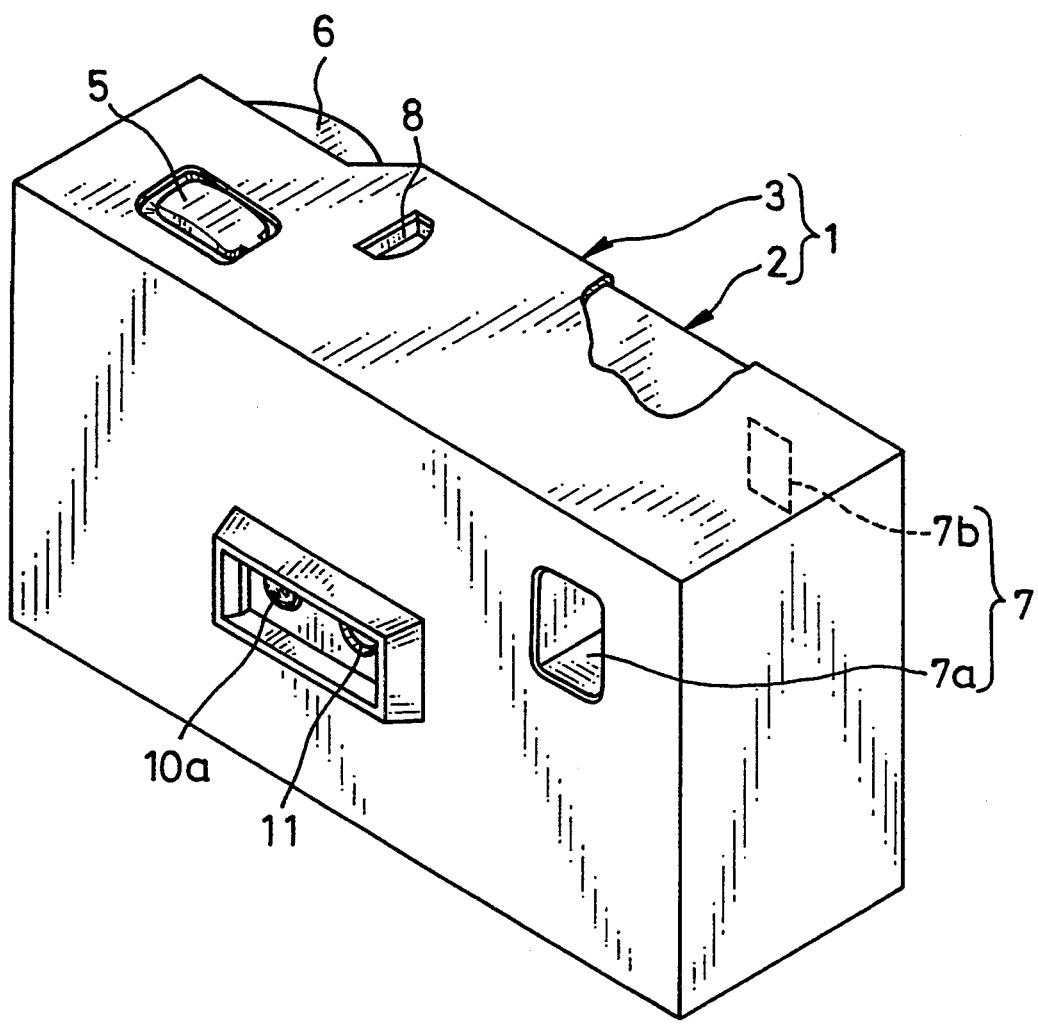
FIG. 1 is a perspective view of a film unit according to a first embodiment of the present invention.

Referring to FIG. 1, a lens-fitted photographic film unit 1 consists of a film housing 2 and an outer casing 3 in which the film housing 2 is encased. The film housing 2 is mainly formed of plastic and the outer casing 3 is formed of cardboard with illustrations and information printed thereon to impart a decorative appearance to the film unit 1. The outer casing 3 is provided with openings for exposing a lens hood 4, a shutter release button 5, a film advancing wheel 6, a viewfinder 7 consisting of front and rear windows 7a, 7b, and a film frame counter window 8. It is thus possible to take photographs with the film housing 2 encased in the outer casing 3.

Within the lens hood 4 are a telephotographic lens 10a for performing telephotography and an opening 11 behind which there is a wide angle lens 10b (see FIG. 2) for performing wide-angle photography. The viewfinder 7 is large enough to observe a taking field for telephotography but smaller than a viewfinder of a conventional film unit having a taking lens for standard photography.

Figure 2:
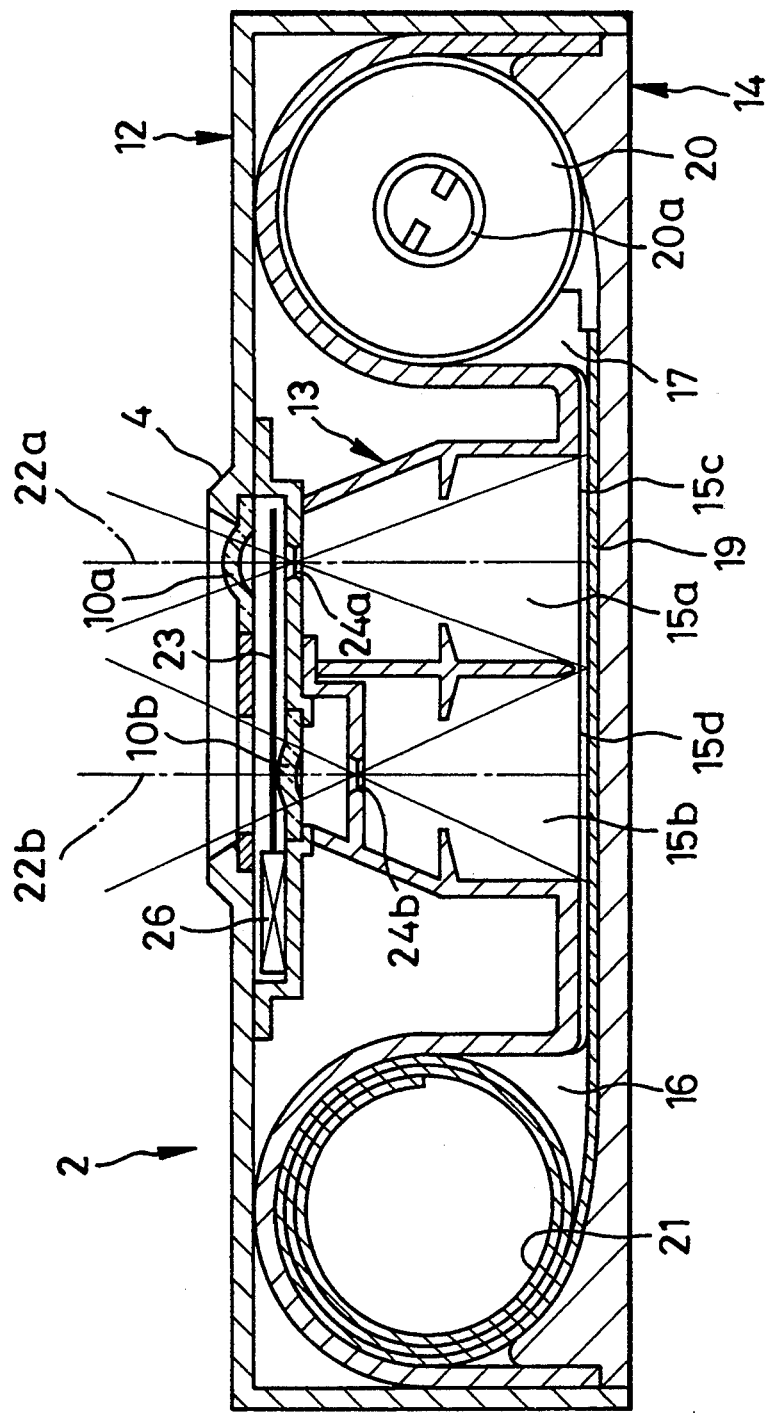
FIG. 2 is a transverse cross section of the film housing of the unit shown in FIG. 1.

As illustrated in FIG. 2, the film housing 2 has a main body 13 and front and rear covers 12 and 14 for covering the main body 13 respectively from the front and the rear. The main body 13 has two exposure chambers 15a and 15b having respective exposure openings 15c and 15d overlying a photographic film 19. A film supply chamber 16 a film take-up chamber 17 are provided on opposite lateral sides of the exposure chambers 15a and 15b. The film take-up chamber 17 contains a photographic film cassette 20 and the film supply chamber 16 contains a film roll 21 formed by drawing the unexposed photographic film 19 from the photographic film cassette 20 and winding it.

When the photographic film cassette 20 is contained in the film take-up chamber 17, a spool 20a of the photographic film cassette 20 is coupled with a fork (not shown) of the film advancing wheel 6 projecting from the upper surface of the film take-up chamber 17. The photographic film cassette 20 with the photographic film 19 is of the 135 type defined by ISO code 1007, 1979 version and the width of the photographic film 19 is 35 mm. The trailing end of the photographic film 19 is secured to the spool 20a rotatably provided in the photographic film cassette 20.

The optical axes 22a, 22b of the respective telephotographic and wide angle lenses 10a, 10b are parallel to each other. The focal length of the telephotographic lens 10a is different from that of the wide angle lens 10b, so that the distance between the telephotographic lens 10a and the focal plane, i.e., the emulsion surface of the photographic film 19 is different from that between the wide angle lens 10b and the emulsion surface. Therefore, the telephotographic lens 10a having a long focal length is disposed in front of a shutter blade 23 while the wide angle lens 10b having a short focal length is disposed behind the shutter blade 23. Apertures 24a, 24b are respectively provided on the optical axes 22a, 22b behind the taking lenses 10a, 10b.

Figure 3:
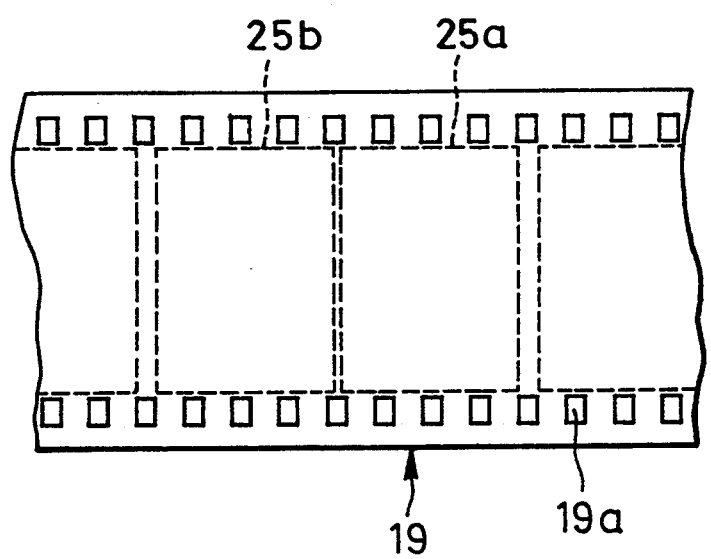
FIG. 3 is a diagram illustrating two original sub-frames taken on a photographic film at the same moment by the film unit of FIG. 1.

A shutter unit 26 having the shutter blade 23 is disposed between the taking lenses 10a, 10b and is actuated upon depression of the shutter release button 5 to cause the single shutter blade 23 to simultaneously open and simultaneously close the apertures 24a, 24b. As a result, two original sub-frames 25a, 25b are formed on the photographic film 19 by a single shutter release operation, as illustrated in FIG. 3. Since the exposure openings 15c, 15d are the same size and the sum of the lateral lengths of the exposure openings 15c, 15d is equal to that of the 35 mm full size original frame (36×24 mm), each of original sub-frames 25a, 25b is a 35 mm half size (18×25 mm). A telephotographic image is formed in the original sub-frame 25a while a standard image is formed in the original sub-frame 25b.

Thereafter, upon rotating the film advancing wheel 6, the spool 20a is rotated via the fork to rewind the exposed portion of the photographic film 19 into the photographic film cassette 20. Consequently, an unexposed portion of the photographic film 19 is advanced from the film roll 21 to be positioned behind the exposure openings 15c, 15d, which causes a sprocket wheel (not shown) to be rotated due to engagement with the perforations 19a of the photographic film 19. When it is detected by rotation of the sprocket wheel that the photographic film 19 has been advanced by a 35 mm full size frame to be ready for the next photo, the film advancing wheel 6 is prevented from further rotation. It is to be noted that reverse rotation of the film advancing wheel 6 is prevented since a pawl (not shown) is engaged with the film advancing wheel 6.

The operation of the above-structured film unit 1 will be described hereinafter. First, the photographer rotates the film advancing wheel 6 until it cannot be further rotated. Then, the photographer frames a main object to be in a proper position, by disposing the main object within the visual field frame of the viewfinder 7. Because the viewfinder 7 is large enough to ascertain the taking field for telephotography, it is ascertained not only that the main subject can be framed or targeted for telephotography, but also that the main subject is positioned in an appropriate location for wide-angle photography. Thereafter, upon depression of the shutter release button 5, the shutter unit 26 drives the shutter blade 23 to open and then close the apertures 24a, 24b.

At this moment, the sub-frame 25a is formed by exposure to light that has passed through the telephotographic lens 10a and the aperture 24a; and the sub-frame 25b is formed by exposure to light that has passed through the wide angle lens 10b and the aperture 24b.

Figure 4:
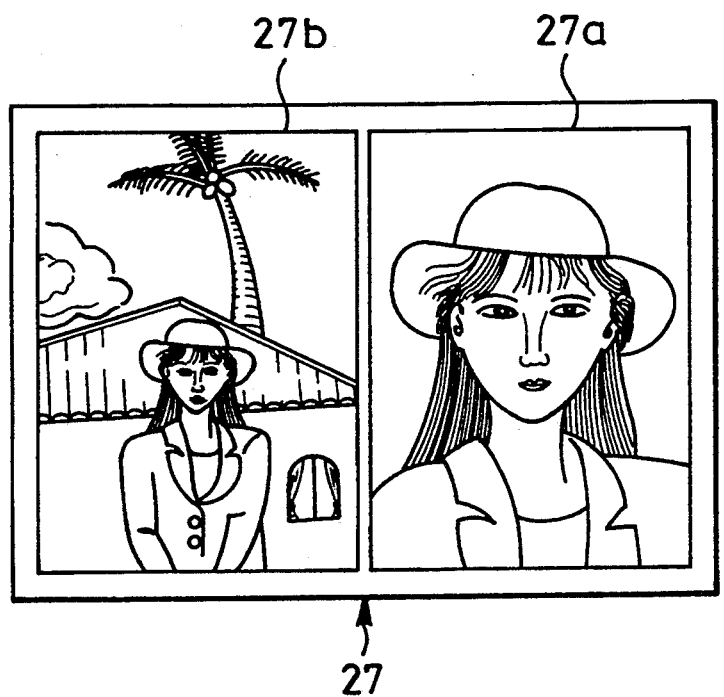
FIG. 4 is a photoprint obtained from the two original sub-frames of FIG. 3.

After having taken a photograph as above, the film advancing wheel 6 is rotated to rewind the exposed portion of the photographic film 19 into the photographic film cassette 20 thereby to position an unexposed portion of the film roll 21 behind the exposure openings 15c and 15d for taking the next photograph. Thus two sub-frames 25a, 25b are formed in a 35 mm full size original frame for each exposure. When the number "0" appears in the film frame counter window 8, all the usable photographic film 19 has been rewound into the photographic film cassette 20. Thereafter, the film unit 1 is forwarded to a photofinishing laboratory via a photofinishing agent with the photographic film cassette 20 contained therein, and is subjected to developing and printing processes to obtain photoprints such as 27, as illustrated in FIG. 4.

The photoprint 27 has print sub-frames 27a, 27b which were taken at the same time. A telephotographic image taken by the telephotographic lens 10a is contained in the print sub-frame 27a while a wide-angle image taken by the wide angle lens 10b is formed in the print sub-frame 27b. Because the viewfinder 7 has an appropriate size to ascertain the taking field for telephotography, the main object is disposed at a proper position in the print sub-frame 27a. Also, the main object is disposed at a proper position in the wide-angle print sub-frame 27b.

In the above embodiment, the telephotographic lens is arranged on the side of the cassette chamber, while the wide-angle lens is arranged on the side of the film chamber. The center of the viewfinder, however, is disposed in a vertical plane that extends between and hence is offset from the centers of the telephotographic and wide-angle lenses. This creates parallax between the field framed through the viewfinder and the taking field of each lens. In particular, parallax with respect to the telephotographic lens is more conspicuous, as the angle of view with the telephotographic lens is smaller.

FIGS. 5 to 8 show another embodiment of a film unit 30 in which the influence of parallax is reduced.

Figure 5:
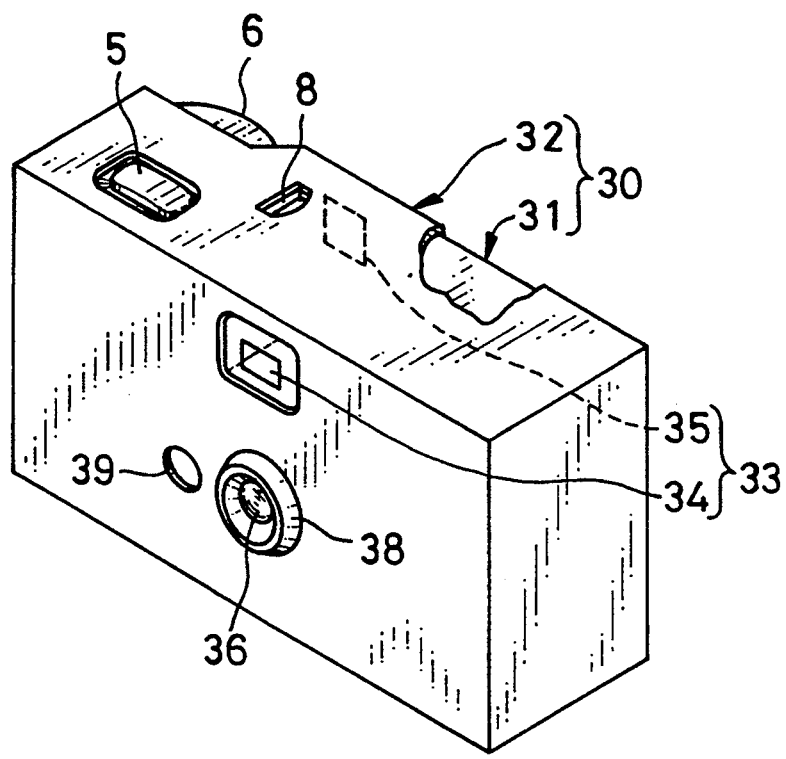
FIG. 5 is a film unit according to another embodiment of the present invention.

Referring to FIG. 5, the viewfinder 33 consists of a front window 34 and a rear window 35. The telephotographic lens 36 is provided within a lens hood 38. A wide angle lens 37 is in horizontal alignment with the telephotographic lens 36 and is exposed to the front through an opening 39 formed in an outer casing 32.

Figure 6:
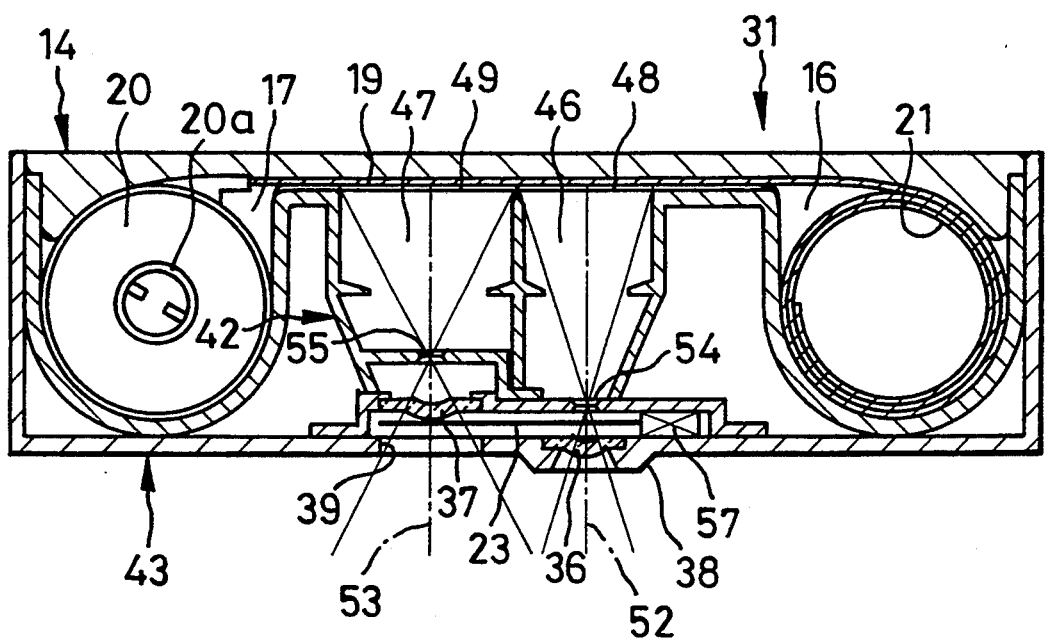
FIG. 6 is a transverse cross section of the film housing of the embodiment of FIG. 5.

Referring to FIG. 6, a film housing 31 is constructed of a main body 42, a front cover 43 and the rear cover 14. The main body 42 is provided in the middle portion with an exposure chamber 46 having an exposure opening 48 and an exposure chamber 47 having an exposure opening 49 corresponding to the respective telephotographic and wide angle lenses 36 and 37. The exposure opening 49 has a width-to-length ratio (aspect ratio) of 9:16 and is larger than the exposure opening 48. The with-to-length ratio of the telephoto exposure aperture 48 is 1:1.4. The area including the exposure apertures 48 and 49 is a 35 mm panoramic size (36×13 mm). The wide angle lens 37 is disposed on the side of the film take-up chamber 17 and the telephotographic lens 36 is disposed on the side of the film supply chamber 16. Therefore, it is possible to dispose the viewfinder 33 directly over the telephotographic lens 36 without interfering with the film wind-up mechanism or the shutter charging mechanism, etc., thereby contributing to further miniaturization of the film unit 31.

The optical axes 52, 53 of the taking lenses 36, 37 are parallel to each other. The focal length of the telephotographic lens 36 is different from the focal length of the wide angle lens 37. If we suppose the respective focal lengths of the taking lenses 36 and 37 to be A and B, the A:B ratio is preferably 1.4:1 to 1.8:1. The taking lens 36 is disposed in front of the shutter blade 23 and the taking lens 37 is disposed behind the shutter blade 23. Apertures 54, 55 lie on the respective optical axes 52, 53.

Figure 7:
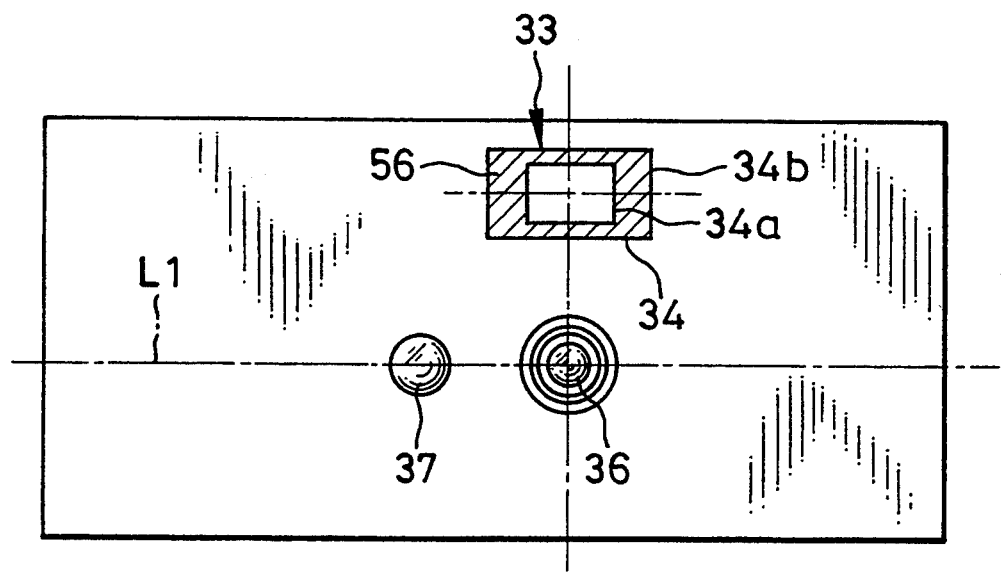
FIG. 7 is a front elevational view of the film housing of FIG. 6.

As illustrated in FIG. 7, the viewfinder 33 is disposed directly above the telephotographic lens 36, that is, in a perpendicular direction to a line L1 passing through the centers of the lenses 36, 37. The viewfinder 33 is large enough to ascertain the taking field for wide-angle photography. The front window 34 of the viewfinder 33 has a colored film (hatched portion) 56 whose size corresponds to a visual field frame 34b for standard photography and whose middle portion corresponds to a visual field frame 34a for telephotography. The colored film 56 is translucent such as grey or the like. Naturally, it is more difficult to see an object through the colored film 56.

In this embodiment, the photographer looks through the viewfinder 33 in order to frame an object to be in a proper position. At this time, it is possible to see the visual field frame 34b for standard photography through the colored film 56 and the visual field frame 34a for telephotography through the clear field frame 34a. The subject should be framed such that it is located within the visual field frame 34a. Upon depression of the shutter release button 9, a shutter unit 57 drives the shutter blade 23 to open and then close the apertures 54 and 55.

Figure 8:
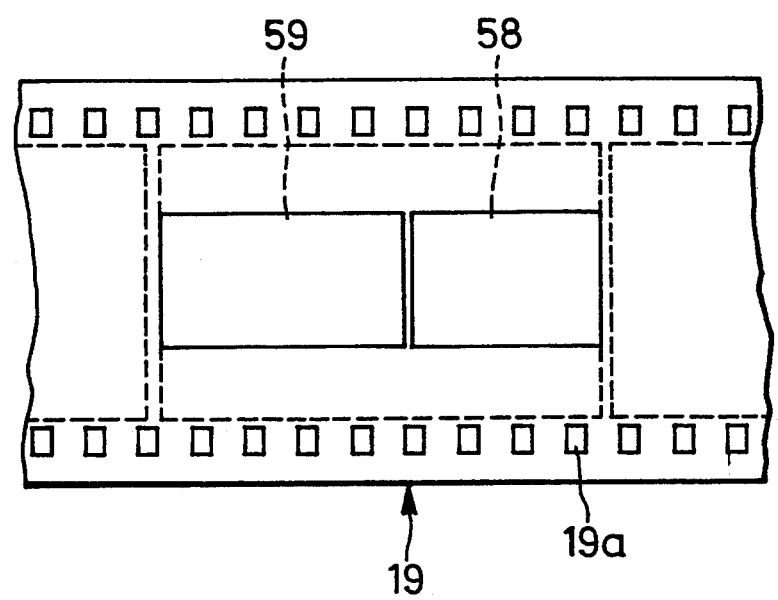
FIG. 8 is a diagram illustrating two original sub-frames taken on a photographic film at the same moment by the film unit of FIG. 5.

At this time, light passing through the telephotographic lens 36 and the aperture 54 falls on the photographic film to form an original sub-frame 58 having a telephotographic image, and light passing through the wide angle lens 37 and the aperture 55 falls on the photographic film 19 to form an original sub-frame 59 having a wide angle image, as illustrated in FIG. 8. Because the sum of the lateral lengths of the exposure chambers 46, 47 is equal to the lateral length of the standard panoramic size original frame, the two original sub-frames 58 and 59 are formed within a standard panoramic size original frame. Both the original sub-frames 58 and 59 are oblong and arranged in horizontal alignment with each other.

The exposed photographic film is then subjected to printing as in conventional panoramic printing processes, in which photoprints are produced of panoramic print size (e.g. 89×254 mm), that is, horizontally elongated. Such a photoprint of panoramic size contains a wide-angle image and a telephotographic image respectively reproduced from the sub-frames 58 and 59 which were recorded simultaneously.

In the above embodiments, two taking lenses having different focal lengths are provided; but more than two taking lenses having different focal lengths may be provided. The terms "telephotography" and "wide-angle (standard)" as used herein are meant only to designate relatively different modes. Therefore, wide-angle photography also refers to standard photography as defined with reference to an angle of view. Formats of plural photographable original sub-frames may be other than those in the above embodiments. Furthermore, it is possible in the embodiment of FIGS. 5 to 8 to provide only the visual field frame 34a of telephotography.

Although the present invention has been fully described by way of preferred embodiments thereof with reference to the accompanying drawings, various changes and modifications will be apparent to those skilled in this field. Therefore, unless otherwise these changes and modifications depart from the scope of the present invention, they should be construed as being included therein.

What is claimed is:

1. A lens-fitted photographic film unit having a film housing having a film take-up chamber and a film supply chamber on opposite lateral ends thereof, said film take-up chamber containing a photographic film cassette and said film supply chamber containing a roll of unexposed photographic film that has been drawn out of said photographic film cassette, said film unit comprising:

a first exposure chamber between said film take-up chamber and said film supply chamber and having a first exposure opening in opposition to a portion of said photographic film to form on said film a first original sub-frame;

a second exposure chamber between said film take-up chamber and said film supply chamber and side by side with said first exposure chamber, and having a second exposure opening in opposition to a portion of said photographic film to form on said film a second original sub-frame;

a first taking lens in front of said first exposure chamber;

a second taking lens in front of said second exposure chamber and having a focal length shorter than that of said first taking lens;

shutter means for exposing said photographic film to form said first and second original sub-frames simultaneously; and a viewfinder having a first visual field frame for observing the taking field of said first taking lens.

2. A lens-fitted photographic film unit as recited in claim 1, wherein said first taking lens is a telephotographic lens and said second taking lens is a wide-angle lens.

3. A lens-fitted photographic film unit as recited in claim 2, wherein said shutter means has a single swingable shutter blade, said telephotographic lens being disposed in front of said shutter blade and said wide-angle lens being disposed behind said shutter blade.

4. A lens-fitted photographic film unit as recited in claim 1, wherein said first and second original sub-frames are formed within a full size original frame of said photographic film.

5. A lens-fitted photographic film unit as recited in claim 1, wherein each of said first and second original sub-frames is a half size original frame.

6. A lens-fitted photographic film unit as recited in claim 1, wherein said first and second original sub-frames are formed inside a panoramic size original frame.

7. A lens-fitted photographic film unit as recited in claim 2, further comprising a lens hood arranged around said telephotographic lens and an opening formed through said film housing, said wide-angle lens being disposed behind said opening.

8. A lens-fitted photographic film unit as recited in claim 1, wherein said viewfinder further includes a second visual field frame arranged around said first visual field frame, and said second visual field frame is adapted to observe a field of said second taking lens.

9. A lens-fitted photographic film unit as recited in claim 2, wherein said viewfinder is disposed directly above said telephotographic lens in order to compensate parallax between said telephotographic lens and said viewfinder.

10. A lens-fitted photographic film unit as recited in claim 9, wherein said telephotographic lens is disposed on the side of said film supply chamber while said wide-angle lens is disposed on the side of said film take-up chamber.

11. A lens-fitted photographic film unit having a film housing having a film take-up chamber and a film supply chamber on opposite lateral ends thereof, said film take-up chamber containing a photographic film cassette and said film supply chamber containing a roll of unexposed photographic film that has been drawn out of said photographic film cassette, said film unit comprising:

a first exposure chamber between said film take-up chamber and said film supply chamber and having a first exposure opening in opposition to a portion of said photographic film to form on said film a first original sub-frame;

a second exposure chamber between said film take-up chamber and said film supply chamber side by side with said first exposure chamber, and having a second exposure opening in opposition to a portion of said photographic film to form on said film a second original sub-frame;

a first taking lens in front of said first exposure chamber;

a second taking lens in front of said second exposure chamber, and having a focal length shorter than that of said first taking lens, the optical axis of said second taking lens being parallel to that of said first taking lens;

shutter means for exposing said photographic film to form said first and second original sub-frames simultaneously; and a viewfinder having a front window and a rear window and being disposed directly above said first taking lens, so as to reduce parallax between said first taking lens and said first original sub-frame.

12. A lens-fitted photographic film unit as recited in claim 11, wherein said viewfinder includes a first viewfinder frame for observing a taking field of said second taking lens and a second viewfinder frame located inside said first viewfinder frame for observing a taking field of said first taking lens.

13. A lens-fitted photographic film unit as recited in claim 12, wherein a front window of said viewfinder is as large as said first viewfinder frame, and is provided with a semi-transparent film having a clear central portion which is as large as said second viewfinder frame.

14. A lens-fitted photographic film unit as recited in claim 11, wherein said shutter means has a single swingable shutter blade, said first taking lens being disposed in front of said shutter blade while said second taking lens is disposed behind said shutter blade.

15. A lens-fitted photographic film unit as recited in claim 11, wherein said first and second original sub-frames are formed within a panoramic size original frame.

16. A lens-fitted photographic film unit as recited in claim 11, wherein the length-breadth ratio of said first original sub-frame is 1:1.4 and a length-breadth ratio of said second original sub-frame is 9:16.

17. A lens-fitted photographic film unit as recited in claim 11, wherein the ratio of the focal length of said first taking lens to the focal length of said second taking lens is 1.4:1 to 1.8:1.

18. A lens-fitted photographic film unit as recited in claim 11 wherein the f-number of said first taking lens is the same as that of said second taking lens.

19. A lens-fitted photographic film unit as recited in claim 11, further comprising a lens hood formed on said film housing and arranged around said first taking lens and an opening formed through said film housing, said second taking lens being disposed behind said opening.

20. A lens-fitted photographic film unit having a film housing having a film take-up chamber and a film supply chamber on opposite lateral ends thereof, said film take-up chamber containing a photographic film cassette and said film supply chamber containing a roll of unexposed photographic film that has been drawn out of said photographic film cassette, said film unit comprising:

a plurality of exposure chambers between said film supply chamber and said film take-up chamber side by side and having respective exposure openings, said respective exposure openings being in opposition to respective portions of said photographic film extending between said film supply chamber and said film take-up chamber;

a plurality of taking lenses each having a different focal length, and each being disposed in front of a respective one of said exposure chambers;

a viewfinder having a visual field frame for observing a taking field of the one of said plurality of taking lenses that has the longest focal length; and shutter means for permitting light passing through each of said plurality of taking lenses to fall on said photographic film so as to form respective original sub-frames simultaneously upon a single shutter release, said original sub-frames being formed within the length of a full size original frame of said photographic film.

21. A lens-fitted photographic film unit as recited in claim 20, wherein all said original sub-frames are arranged in a 35 mm full size.

22. A lens-fitted photographic film unit as recited in claim 20, wherein all said original sub-frames are arranged in a 35 mm panoramic size.

23. A lens-fitted photographic film unit as recited in claim 20, wherein said viewfinder has a visual field frame for observing a taking field of a first of said taking lenses and a visual field frame for observing a taking field of a second of said taking lenses.

24. A lens-fitted photographic film unit having a preloaded unexposed photographic film, a first taking lens, and a second taking lens having a shorter focal length than said first taking lens, said film unit comprising:

a shutter blade for permitting light passing through each of said first and second taking lenses to fall on said photographic film so as to form two respective original sub-frames simultaneously upon a single shutter release;

said first taking lens being disposed in front of said shutter blade while said second taking lens is disposed behind said shutter blade.

25. A lens-fitted photographic film unit as recited in claim 24, further comprising a viewfinder for observing a taking field of at least said first taking lens.

26. A lens-fitted photographic film unit as recited in claim 24, wherein said two original sub-frames are formed within a full size original frame.

27. A lens-fitted photographic film unit as recited in claim 24, wherein said two original sub-frames are formed within a panoramic size original frame.

28. A lens-fitted photographic film unit having a preloaded unexposed photographic film, a first taking lens, a second taking lens having a shorter focal length than said first taking lens, and a single shutter blade for permitting light passing through each of said first and second taking lenses to fall on said photographic film so as to form two respective original subframes simultaneously upon a single shutter release.

* * * * *